UNITED STATES PATENT OFFICE.

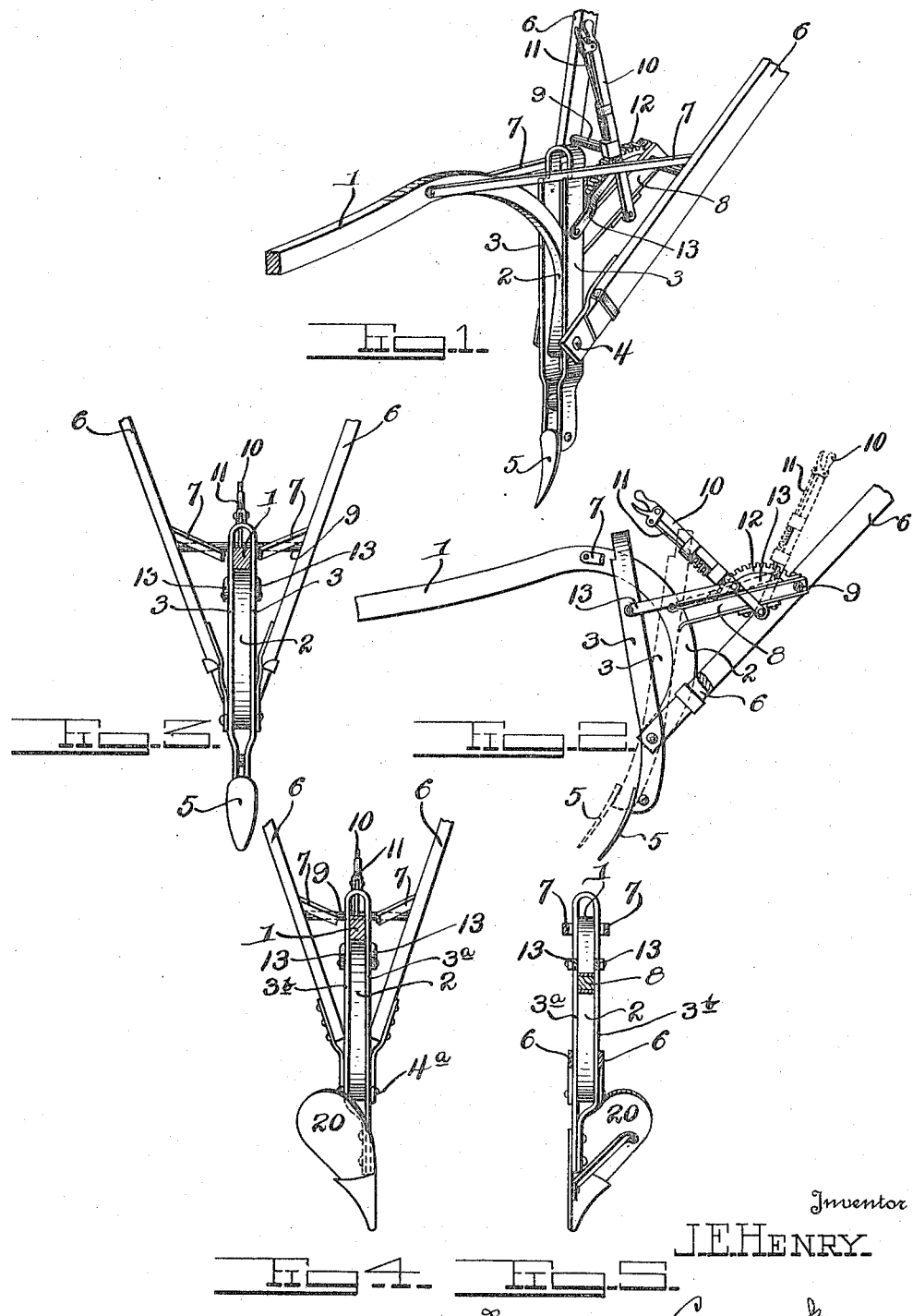

JOHN E. HENRY, OF HARDEEVILLE, SOUTH CAROLINA.

PLOW.

1,193,261.   Specification of Letters Patent.   Patented Aug. 1, 1916.

Application filed October 29, 1915. Serial No. 58,593.

*To all whom it may concern:*

Be it known that I, JOHN E. HENRY, a citizen of the United States, residing at Hardeeville, in the county of Beaufort and State of South Carolina, have invented new and useful Improvements in Plows, of which the following is a specification.

This invention relates to improvements in plows and more particularly to a plow having means for adjusting the angle of the plow share to the beam.

It is the object of this invention to construct a plow having an adjustable plow share standard by which the operator may change the regular relation of the plow share to the beam to regulate the depth of the furrow according to the different conditions met while plowing. The advantages of this improved construction are that the angular relations of the plow share may be adjusted at will by the operator without discontinuing his plowing, there are no projections between or below the handle to obstruct the operator, the construction is simple, durable, and, on account of the leverage, is easily operable.

While the preferred forms of this invention are illustrated upon the accompanying sheet of drawing yet it is to be understood that minor detail changes may be made without departing from the scope thereof.

Figure 1 is a view in perspective of one form of this improved plow. Fig. 2 is a view in side elevation of Fig. 1, with parts broken away, illustrating the plow share standard in different adjustments. Fig. 3 is a view in front elevation of Fig. 1, with parts broken away. Fig. 4 is a similar view of a modified form of a plow. Fig. 5 is a rear elevation of Fig. 4.

In the embodiment of this invention illustrated on Figs. 1, 2, and 3, the beam 1 is curved downwardly at its rear end 2 substantially upon a semi-circle tangential to the main body. The plow share standard is in the form of a bracket, known as a grasshopper frame, having sides 3 arranged on each side of the curved portion 2 of the beam, united at the top above the beam, pivoted to the lower end of the beam with the sides 3 extending below the pivot 4, inclined forwardly and converging laterally to form the usual means for securing a shovel plow share 5. The handles 6 are secured to the frames 3 and beam 1 by the pivot 4 and to the upper portion of the beam by the braces 7. A substantially horizontal support 8 is secured between the curved rear portion 2 of the beam and a cross-brace 9 between the handles. A forked operating lever 10 pivoted upon the under side of the support is provided with a spring latch 11 for engagement with a segment 12 upon the upper side of the support to hold the lever in any desired position. Links 13 connect the sides 3 of the frame from points remote to their pivot 4 to the forked portions of the lever on both sides of the support a short distance above the lever pivot, whereby a small application of power to the lever will easily adjust the plow share and when adjusted positively and rigidly hold it in that position. The curved end 2 of the beam passing between the sides of the standard frame with the operating lever support extending substantially horizontally from the curved portion of the beam to the cross-brace of the handle leaves the space below the handle free and the forward inclination of the bottom of the standard frame and beam end provides a clearance above and to the rear of the plow share avoiding clogging by grass or weeds turned up by the plow.

Figs. 4 and 5 illustrate the application of this improved construction to a turning plow in which one side $3^a$ of the plow share standard frame is continued below the pivot $4^a$ in a straight line while the other side $3^b$ is bent in and brought against the sides $3^a$ below the end of beam providing means for the adjustment of a turning plow 20.

The other parts are constructed as above-described and operate in the same manner.

What I claim is:—

1. In a plow, the combination with a beam, of a standard frame embracing and pivoted to the rear end of the beam having extensions below said beam end for the attachment of a plow share, having handles secured to said frame and beam, a support secured to said beam and handles, an operating lever pivoted to said support and a connecting link from a point adjacent the lever pivot to a point remote from the frame pivot.

2. In a plow, the combination with a beam having a downwardly curved rear portion, of a standard frame embracing said curved portion and pivoted to the rear end of the beam with the sides of the frame brought together below the beam end, handles secured at the lower end of the frame and beam by the pivot of the frame, said handles having a cross-brace and a substantially horizontal support secured to the rear curved portion of the beam and handle cross-brace, an operating lever pivoted to the support, and a link connecting the lever adjacent its pivot point to the frame at a point remote from the frame pivot.

JOHN E. HENRY.

Witnesses:
C. M. McTeer,
S. R. Marvin.

Copies of this patent may be obtained for five cents each, by addressing the "Commissioner of Patents, Washington, D. C."